May 19, 1964　　　　J. W. ANHALT　　　　3,133,777
QUICK DETACHABLE COUPLING

Filed Aug. 16, 1962　　　　　　　　　　　　2 Sheets-Sheet 1

INVENTOR.
JACK W. ANHALT
BY Huebner & Worrel
ATTORNEYS.

May 19, 1964   J. W. ANHALT   3,133,777
QUICK DETACHABLE COUPLING
Filed Aug. 16, 1962   2 Sheets-Sheet 2
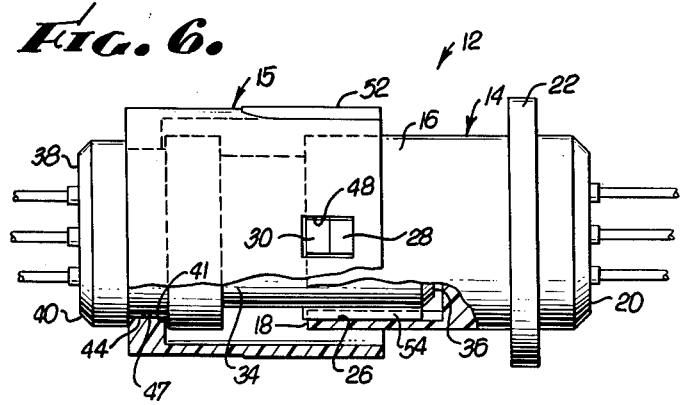
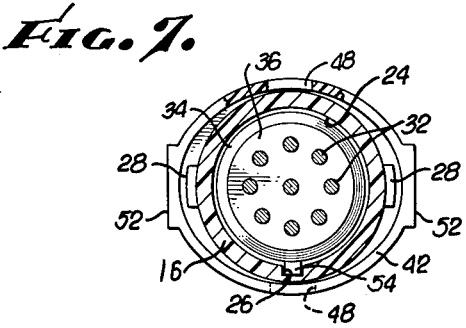
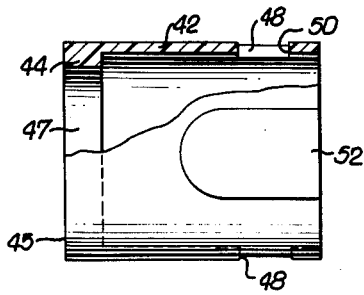
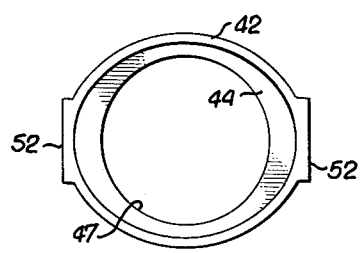
INVENTOR.
JACK W. ANHALT
BY
Huebner & Worrel
ATTORNEYS.

United States Patent Office 3,133,777
Patented May 19, 1964

3,133,777
QUICK DETACHABLE COUPLING
Jack W. Anhalt, La Crescenta, Calif., assignor to Cannon Electric Company, Los Angeles, Calif., a corporation of California
Filed Aug. 16, 1962, Ser. No. 217,392
10 Claims. (Cl. 339—91)

This invention relates to quick detachable couplings for conduits in general, in which category the mating parts of electrical connectors are classified for the purposes of this description.

An object of the invention is to provide a quick detachable coupling of few parts, simple in construction, readily manipulated, positive in function, and adaptable to miniature and micro-miniature structural design.

A more particular object of this invention is to provide a coupling sleeve of unique configuration which embodies a resilient and flexible entrance section which possesses sufficient inherent tension to retain the sleeve in coupled relation to a complementary lug bearing member, which tension can be overcome by radial finger pressure to release the sleeve from such lug bearing member.

A further object of this invention, when utilized with and as a part of an electrical connector, is to provide a receptacle connector member and a plug connector member wherein the plug connector member is fitted with a coupling sleeve element which embodies the features described above, and the receptacle connector member is the first tubular member as identified above and which is formed with the lugs engageable in the latching recess of the sleeve.

The invention broadly comprises a first tubular member provided with externally projecting lugs and a second tubular member to be coupled to the first such member, the second tubular member having rotatably mounted thereon a sleeve formed with latching recesses receiving the lugs in latching relationship, the sleeve being restrained against axial movement on the second tubular member, and the sleeve being oval in cross section with a smaller diameter adapted to snugly slide over the first tubular member and the recesses being disposed in the region of such smaller diameter, the larger diameter providing a clearance between the first tubular member and the larger diameter sections of the sleeve, the sleeve being of resilient and flexible material manipulatable by squeezing the sleeve externally at its larger diameter to increase the smaller diameter sufficiently so that the lugs may be introduced into or withdrawn from the recesses in the sleeve.

The coupling described may be applied to various kinds of tubular members, as for example, conduits for conveying fluids, or the mating members of electrical connectors. The latter application is the one chosen for illustration in the drawings and detailed description in the specification. It offers particular utility in the field of miniature and micro-miniature electrical connectors.

The foregoing and other objects and advantages of the invention will be made further apparent from a consideration of the detailed description which follows taken in conjunction with the accompanying drawings in which:

FIGURE 6 is a top elevational view partly in section, of the mated coupling shown in FIGURE 3;

FIGURE 7 is a cross sectional view similar to FIGURE 5 showing the receptacle connector member rotated 90°;

FIGURE 8 is a side elevational view partly in section of a coupling sleeve; and

FIGURE 9 is a front elevational view of the coupling sleeve illustrated in FIGURE 8.

Figure 1:
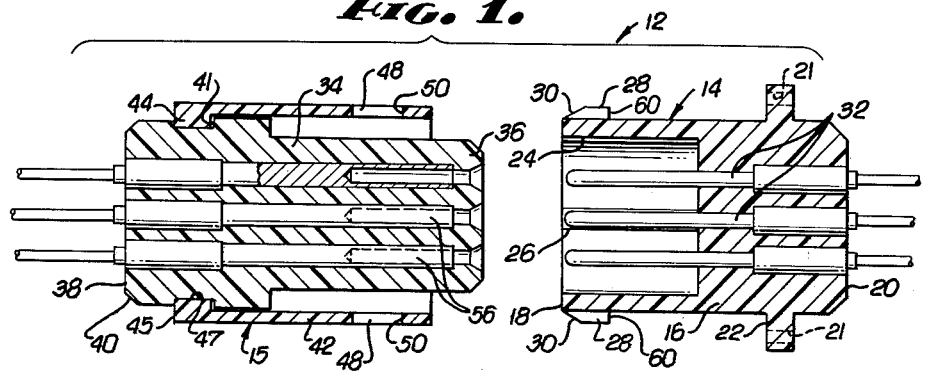
FIGURE 1 is an exploded longitudinal cross sectional view of the coupling including a receptacle electrical connector member and a plug electrical connector member.
Figure 2:
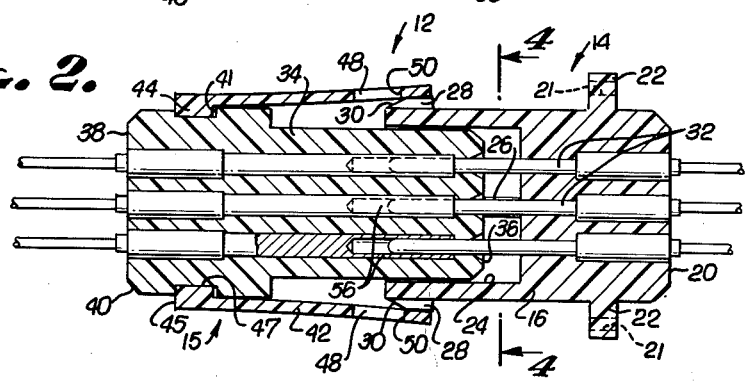
FIGURE 2 is a similar view of the receptacle connector member and plug connector member in partial engagement.
Figure 3:
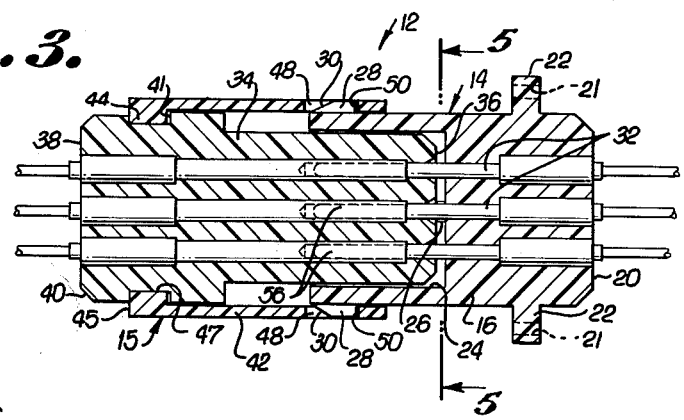
FIGURE 3 is a similar view of the receptacle connector member and plug connector member completely mated.

The coupling illustrated, being utilized with and as a part of an electrical connector, is generally designated 12 and includes a receptacle connector member 14 and a plug connector member 15. The receptacle connector member 14 embodies a generally elongated receptacle shell 16 which is circular in cross section and includes a forward end 18 and a rearward end 20. This shell 16 preferably is formed with a mounting flange 22 adjacent the rearward end 20, the flange having screw or rivet holes 21. This mounting flange may be used to secure the receptacle connector member 14 to any suitable panel or other structure. At the forward end 18 of the shell 16 there is formed a receptacle bore 24 which terminates rearwardly toward end 20 and is circular in cross section. At least one polarizing keyway 26 is formed in the bore 24.

A pair of diametrically spaced lugs or projections 28 are formed on the shell 16 and radially project outward therefrom. These lugs include chamfered or beveled surfaces 30.

In the particular embodiment of the invention as shown and described, electrical pin contact terminals 32 are secured in the shell 16 whereby the pins will project outwardly into the bore 24 and which are mateable with electrical socket terminals later described.

Referring in more detail to the plug connector member 15, there is provided an elongated plug barrel 34 which is circular in cross section and has an external diameter generally corresponding to the diameter of the bore 24 of the receptacle connector member 14. The plug barrel 34 has a forward end 36 and a rearward end 38. At the rearward end 38 of the plug barrel there is formed an annular chamfer or bevel 40. Adjacent such end 38 is an annular retention groove 41 for a purpose to be described.

A coupling sleeve 42 generally oval shaped in cross section, as best seen in FIGURE 9, has major and minor diameters. This sleeve is concentrically rotatably mounted on the barrel 34.

Additionally, the minor diameter of the sleeve corresponds to the diameter of the shell 16, while the major diameter is wider than the diameter of the shell. The structure comprises an internal annular retention flange 44 at the rearward end 45 of the sleeve, which flange is rotatably confined in the groove 41. The sleeve is formed of resilient and flexible material, which enables installation of the flange in the groove to be accomplished by forcing the sleeve over the chamfered end of the plug barrel 34 and sliding the sleeve forwardly until the flange snaps into the groove. The internal face 47 of the flange defines a generally true circle for rotational movement in the groove, and has an axis in common with the axis of the oval configuration of the sleeve. The minor diameter of this sleeve generally coincides with the external diameter of the shell 16 for sliding reception of such shell.

The coupling sleeve 42 is provided adjacent the end remote from the flange 44 with a pair of latching recesses 48 providing forward latching shoulders 50. These recesses 48 are diametrically opposed on the minor diameter of the sleeve 42.

Further, the coupling sleeve 42 is formed with a pair of generally flat finger gripping surfaces 52 diametrically opposed on the major axis. These finger grips 52 are utilized in engaging and disengaging the two coupling members.

Figure 4:
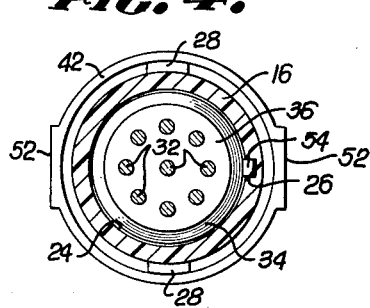
FIGURE 4 is a cross sectional view taken on line 4—4 of FIGURE 2.
Figure 5:
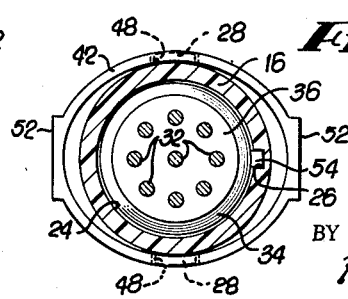
FIGURE 5 is a cross sectional view taken on line 5—5 of FIGURE 3.

At least one polarizing key 54, best seen in FIGURES 4 and 5, is formed along the exterior surface of the plug barrel 34, corresponding in length and cross sectional configuration with the polarizing keyway 26. Additionally, the plug barrel 34 is fitted wtih any suitable electrical socket contact terminals 56 which are mateable with the pins 32 in the receptacle connector member 14.

It is essential that the forward portion of the coupling sleeve 42 (as well as the flanged portion thereof) be formed of resilient and flexible material so that it may be distorted from its oval configuration by pressure on the opposite finger grips and yet when released will return to its original shape. It should not possess any appreciable elasticity in an axial direction.

By way of example only, and not of limitation, examples of suitable material for the coupling sleeve are a resilient metal or a plastic material having resilient flexible characteristics, including but not limited to a polyamide such as "Nylon," a fluorethylene such as "Kel-F," an acetate such as "Delrin," or a polycarbonate such as "Lexan."

The operation should be clear from the foregoing description but will be here reviewed and summarized. The coupling and electrical connector action is the same whether or not the receptacle connector member 14 is riveted or otherwise secured upon a panel (the latter not being illustrated). The plug connector member 15 is advanced in general axial alignment toward the receptacle connector member 14. The plug barrel 34 is thus brought into engagement in the bore 24 and should the two members not be in correct rotational relationship they are relatively rotated until the key or keys 54 are in longitudinal alignment with the keyways 26 whereupon the two members are further mutually advanced so that the plug barrel is received into the bore 24 for the full depth of the bore. The corresponding pin contact terminals 32 and socket terminals 56 are mutually engaged.

The only relative rotation of the two members which is essential when effecting the coupling of the two members is that necessary to align the keys and keyways and consequently the pins and sockets.

The mutually advancing movement of the two members, in the event that the diametrially opposed retention lugs 28 are disposed opposite the smaller diameter of the sleeve, will result in the lugs exerting a camming action against the forward end of the sleeve causing the smaller diameter to increase by a radially outward flexing of the wall thereof under the action of the lugs, whereupon continued mutual advancement of the two members will bring the lugs into registry with the retention recesses 48 whereupon the sleeve will by its inherent resilient and flexible characteristics resume its oval shape with the lugs protruding into the recesses and being secured against withdrawal therefrom by engagement of shoulders 60 with recess retention shoulders 50.

If it occurs that the mutual advance of the two members is made while the lugs are opposite the major diameter of the sleeve they will enter without resistance and when the parts are in the assembled relationship the sleeve may be rotated until the lugs and the recesses are in registry whereupon the securement will be automatically effected by the contraction of the sleeve as the recesses come into rotational alignment with the lugs.

A third manner of introducing the two members into coupling relationship is to grasp the finger gripping surfaces 52 between the thumb and forefinger and squeeze the sleeve so as to increase the minor diameter while decreasing the major diameter to an extent where the diameter is approximately a true circle in which condition the lugs will readily slide into the sleeve, and upon release of the finger pressure the sleeve will resume its original oval shape and if the lugs and the recesses are in alignment they will mutually snap into engagement; if they are not in actual alignment a simple rotation of the sleeve relative to the receptacle will achieve the necessary result.

Uncoupling is accomplished by a squeezing action applied to the finger gripping surfaces to reduce the larger diameter and increase the smaller diameter to a sufficient extent that the lugs are freed from the recesses and the two members can be mutually retracted longitudinally. The thickness of the wall of the sleeve and the relative height of the lugs on the receptacle member and the outside diameter of the latter may be such as to result in a necessary momentary reversal of the positions of the minor diameter and major diameter. In other words it may be necessary to squeeze the sleeve during the coupling and uncoupling operations to a sufficient extent that the normal major diameter becomes the minor diameter and the normal minor diameter becomes the major diameter for the entrance or withdrawal of the receptacle member. The total internal oval surface of the sleeve obviously must be of sufficient magnitude to accomplish the purpose desired. In this connection it is preferable that the normal minor diameter be such as to receive the receptacle member with a reasonably snug fit and the additional surface required obviously results in a spacing between the surface of the receptacle member and the major diameter areas of the sleeve.

The positioning of the finger gripping surfaces 52 externally in the region of the major axis of the coupling sleeve 42 serves a double function of affording convenient pressure areas for gripping between thumb and finger and secondly to index the area to which pressure must be applied to flex the sleeve. Although these finger gripping surfaces are desirable, they could be dispensed with without sacrificing the major features of the invention.

It has been found in practice that materials and proportions may be employed in the fabrication of this coupling assuring a fully satisfactory and dependable retention of the coupling members but at the same time requiring a relatively light finger pressure to achieve the release of the latching means, thus making this coupling especially suitable for application in miniature and microminiature forms.

While I have herein shown and described my intention in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices. Thus, although the device illustrated in the drawings and described with reference thereto is an embodiment of a quick detachable coupling with a built in electrical connector, the primary coupling elements could be utilized for hollow tubular conduits, for example, by substituting a relatively large axial bore through each of the coupling members in lieu of the relatively small bores in which are mounted elements of the electrical contact terminals. Various adaptations would be apparent to those skilled in the art.

Having described my invention, what I claim as new and desire to secure by Letters Patent is:

1. A quick detachable electrical connector coupling comprising an annular receptacle member, a bore formed in said receptacle member, an electrical contact terminal mounted in said receptacle member and having a portion of said terminal in said bore, at least one latching element extending radially from the external surface of said receptacle member, an annular plug element adapted to mate within said bore and an electrical contact terminal mounted in said plug element and adapted to physically and electrically engage said electrical contact of said receptacle member, a sleeve rotationally mounted on said plug element and having at least one retention recess formed in said sleeve adapted to receive said latching element, said sleeve having an oval cross section with a minor diameter and a major diameter and possessing physical resiliency and flexibility whereby the major diameter may be reduced by external pressure and the minor diameter increased and upon cessation of pressure the sleeve returns to its original diameters, the annular receptacle being insertable in said sleeve, and the recess being located at the general tangent of the minor diameter whereby to normally but releasably retain the latching element within the recess to hold the receptacle in the sleeve.

2. A quick detachable electrical connector coupling as defined in claim 1 wherein the minor diameter of said sleeve generally corresponds to the outer diameter of the annular receptacle member.

3. A quick detachable electrical connector coupling as defined in claim 1 wherein electrical connector polarizing means are included in said bore and on said plug element to assure a proper connection between said electrical contact terminals.

4. A quick detachable electrical connector coupling as defined in claim 1 wherein said sleeve is formed with a pair of finger gripping surfaces in the region of the major diameter diametrically spaced one from the other to localize the areas for application of external pressure to flex said sleeve.

5. A quick detachable electrical connector coupling comprising complementary engageable members, one of said members being an annular receptacle having a bore therein, an electrical contact terminal mounted in said receptacle and having a portion of said terminal projecting into said bore, the second of said members including an annular plug having a cross sectional configuration generally corresponding to the cross sectional configuration of said bore and insertable within said bore, electrical contact terminals mounted in said plug and adapted to physically and electrically engage said terminals of said receptacle, said second member also including a sleeve resilient and flexible diametrically and relatively non-elastic axially and possessing an oval cross section yieldable under pressure to reduce its major diameter and thereby increase its minor diameter and returnable in the absence of pressure to its original oval cross section, said annular receptacle having a diameter less than the major diameter of the sleeve, coacting latching elements on the sleeve and said annular receptacle retaining the members against separation when the sleeve remains in its original oval form and releasable for separating the members when pressure is applied to the sleeve to reduce the major diameter and increase the minor diameter.

6. A quick detachable electrical connector coupling as defined in claim 5 wherein said coacting latching elements include lug projections radially outwardly extending from said receptacle and lug retention recesses formed in said sleeve.

7. A quick detachable electrical connector coupling as defined in claim 5 wherein said sleeve includes pressure indexing means whereby pressure may be exerted to flex said sleeve.

8. A quick detachable electrical connector coupling as defined in claim 7 wherein said pressure indexing means includes a pair of diametrically opposite generally flat parallel finger surfaces on said sleeve in the region of the major diameter of said sleeve.

9. A quick detachable electrical connector coupling of the pinch sleeve type comprising: an annular receptacle shell including a bore therein, a pair of diametrically opposite retention lugs on the exterior surface of said shell and extending radially outward therefrom, said lugs including forward beveled surfaces, an electrical contact terminal mounted in said shell and including a portion projecting into said bore, an annular plug body engageable with said shell within said bore, an electrical contact terminal mounted in said plug body and engageable with said terminal of said receptacle, a coupling sleeve rotatably mounted on said plug body and being restrained against axial movement thereon, said sleeve being resilient and flexible and possessing an oval shaped cross section said sleeve having a major diameter wider than the diameter of said shell, finger gripping surfaces diametrically opposed formed on said major diameter, diametrically opposed retention recesses formed in said sleeve on the minor diameter thereof and adapted to receive said lugs and retain said shell and said plug body in coupling engagement when said sleeve is in its original oval form and releasable for separating the receptacle and plug body when external finger pressure is applied to said finger gripping surfaces of said sleeve to reduce the major diameter and increase the minor diameter.

10. A quick detachable coupling of pinch sleeve type comprising: a first member embodying an annular insert body mounting at least one latching element extending radially from the surface of said body, a second member embodying a central annular core adapted to abut with said insert body and a sleeve rotationally mounted on said core and having at least one retention recess formed in said sleeve adapted to receive said latching element, said sleeve having an oval cross section with a minor diameter and a major diameter and possessing physical resiliency and flexibility whereby the major diameter may be reduced by external pressure and the minor diameter increased and upon cessation of pressure the sleeve returns to its original diameters, the recess being located at the general tangent of the minor diameter whereby to normally but releasably retain the latching element within the recess, said latching element being a projecting lug including a forward beveled face whereby said face may cam and flex said sleeve when the sleeve and insert body are introduced together with the minor diameter of the sleeve generally in alignment with the projecting lug so that said lug may be received in said retention recess and a shoulder on said latching element opposite said forward beveled face retaining said latching element within said retention recess until external pressure is reapplied to said sleeve to disengage said recess from said latching element.

References Cited in the file of this patent
UNITED STATES PATENTS

| | | |
|---|---|---|
| 2,235,020 | Jones | Mar. 18, 1941 |
| 2,307,592 | Kuhlman | Jan. 5, 1943 |
| 2,499,825 | Havlicek | Mar. 7, 1950 |
| 2,782,391 | Kirk | Feb. 19, 1957 |
| 2,787,770 | Arson | Apr. 2, 1957 |
| 2,829,416 | Sam | Apr. 8, 1958 |